United States Patent [19]
McConnell

[11] Patent Number: 5,507,597
[45] Date of Patent: Apr. 16, 1996

[54] UNDERGROUND PIPE REPLACEMENT METHOD

[76] Inventor: W. Harry McConnell, P.O. Box 751803, Houston, Tex. 77275-1803

[21] Appl. No.: 241,765

[22] Filed: May 12, 1994

[51] Int. Cl.$^6$ .............................. F16L 55/18; F16L 1/028
[52] U.S. Cl. ........................................ 405/156; 405/184
[58] Field of Search .................................. 405/154, 156, 405/184; 138/97

[56] References Cited

U.S. PATENT DOCUMENTS

| | | | |
|---|---|---|---|
| 3,181,302 | 5/1965 | Lindsay | 61/72.7 |
| 4,249,620 | 2/1981 | Schmidt | 175/53 |
| 4,505,302 | 3/1985 | Streatfield et al. | 138/97 |
| 4,507,019 | 12/1987 | Thompson | 405/154 |
| 4,634,313 | 1/1987 | Robbins | 405/184 |
| 4,648,746 | 3/1987 | Abinett | 405/184 |
| 4,674,914 | 6/1987 | Wayman et al. | 405/154 |
| 4,693,404 | 9/1987 | Wayman et al. | 225/103 |
| 4,720,211 | 1/1988 | Streatfield et al. | 405/154 |
| 4,732,222 | 3/1988 | Schmidt | 175/22 |
| 4,738,565 | 4/1988 | Streatfield et al. | 405/154 |
| 4,767,236 | 8/1988 | Rice | 405/154 |
| 4,848,964 | 7/1989 | Yarnell | 405/154 |
| 4,886,396 | 12/1989 | Akesaka | 405/184 |
| 4,903,406 | 2/1990 | Schosek et al. | 30/92.5 |
| 4,925,344 | 5/1990 | Peres et al. | 405/184 |
| 4,930,542 | 6/1990 | Winkle et al. | 138/98 |
| 5,076,731 | 12/1991 | Luksch | 405/154 |
| 5,078,546 | 1/1992 | Fisk et al. | 405/156 |
| 5,112,158 | 5/1992 | McConnell | 405/154 |
| 5,171,106 | 12/1992 | Rockower et al. | 405/156 |
| 5,207,533 | 5/1993 | Federspiel et al. | 405/156 |
| 5,439,320 | 8/1995 | Abrams | 405/184 X |

FOREIGN PATENT DOCUMENTS

| | | | |
|---|---|---|---|
| 269781 | 10/1989 | Japan | 405/154 |
| 2003909 | 11/1993 | U.S.S.R. | 405/154 |
| 2213904 | 8/1989 | United Kingdom | 405/154 |
| WO9320371 | 10/1993 | WIPO . | |

OTHER PUBLICATIONS

McConnell Method; *The McConnell Pipe Replacement Method;* (1 page).
The Sentinel; *Technique Causes Few Hassles;* Dec. 30, 1992; (1 page).

*Primary Examiner*—Hoang C. Dang
*Attorney, Agent, or Firm*—Pravel Hewitt Kimball & Krieger

[57] ABSTRACT

The underground pipe replacement method and apparatus includes placing a ripping tool having cutting blades into the bore of one end of the existing pipe; pulling the ripping tool through the bore of the existing pipe and cutting a plurality of slots through the wall of the existing pipe; disposing a length of rods throughout the existing pipe as the ripping tool passes through the existing pipe; plugging one end of the ripped pipe and allowing water to pass through the open end of the pipe; allowing the water to stand in the existing pipe and flow through the slots in the pipe and into the formation; softening the earth formation around the pipe; and crushing the existing pipe with a crushing tool.

11 Claims, 2 Drawing Sheets

UNDERGROUND PIPE REPLACEMENT METHOD

BACKGROUND OF THE INVENTION

The present invention relates generally to the replacement of underground pipes, and more particularly, to methods and apparatus for replacing fracturable pipes with new pipes which may be of the same size as, or larger than, the old pipes. Still more particularly, the present invention relates to methods and apparatus for replacing existing sewer pipes, water pipes, gas mains, or the like by first ripping the existing pipes to allow the passage of moisture therethrough, then allowing existing sewage and water to fill the ripped pipe and then to flow into the earth formation surrounding the pipe to soften the surrounding earth formation. Upon softening the earth formation surrounding the ripped existing pipe, the existing pipe is then crushed and the debris or shards forced outwardly into the surrounding softened earth formation thereby forming a bore of an appropriate size to pull the replacement pipe into the bore.

It is often necessary repair or replace underground pipes which have lost their fluid-carrying capacity or integrity due to age, the action of corrosive substances, or the effects of other deleterious conditions or hazards. Often repair or replacement is necessary to prevent the fluid which is passing through the pipe to leak into the surrounding earth or other environment. Such leakage could lead to contamination of the surrounding soil or subterranean potable water sources or supplies, for example in the case of underground sewer lines, or to contamination of the fluids carded within the underground pipes, for example in the case of underground water lines. Such leakage could also lead to potentially destructive conditions, placing property and health at risk, for example in the case of underground gas mains. If an underground natural gas main were to leak and allow gas to escape, such leakage could lead to an explosive accumulation of gases in a subterranean reservoir or other formation.

Repair or replacement also sometimes becomes necessary to restore the fluid-carrying capacity of the underground pipes. A sewer line which has become decomposed or broken, often cannot carry the volume of material for which it was designed. This can lead to temporary backups in the event the sewer system becomes deluged by an unusual event, such as a storm, or eventually to complete blockages.

One technique used for replacing underground pipes has been to cut or slit them longitudinally by pulling a cutting tool through the pipes; expanding the resulting segments outwardly with an expanding tool, which may also comprise the cutting tool, to make room for the new pipes; and pulling the new pipe into the space thus created, typically behind and along with the expanding or expanding/cutting tool. Such a technique is useful particularly for pipes made of materials such as steel which do not normally fracture into irregularly-shaped pieces or shards when engaged by a blow or like impact. These techniques may be used to replace an old pipe with one of an equal or larger diameter, if desired. An example of this type of technique is disclosed in U.S. Pat. No. 4,903,406 to Schosek et al. That patent disclose a pipe splitter having a cutting wheel adapted for cutting a pipe, such as a black iron pipe, along a single longitudinal path when pulled through the pipe. An expander may be pulled through the split pipe for spreading the pipe apart, and a new pipe pulled into place trailing the expander. Another example of this type of technique is disclosed in U.S. Pat. No. 3,181,302 to Lindsay. The Lindsay apparatus is adapted to split or cut the existing pipe longitudinally at two locations, for example into two halves, rather than at one location as in the Schosek patent. Examples of other devices used in the past for cutting, ripping, or splitting pipes, casing, tubing, or the like are found in U.S. Pat. Nos. 642,367; 1,001,205; 1,519,882; 1,618,368; 2,502,711; 2,638,165; 2,834,106; 2,947,253; 2,983,042; and 3,023,040.

Another technique used in the past for replacing underground pipes with the same or larger diameter pipes, if desired, has been to burst them from the inside by pulling or pushing a bursting tool through the pipes; expanding the resulting pipe fragments outwardly with an expanding tool, which may also comprise the bursting tool, to make room for the new pipe; and pulling the new pipe into the space thus created, typically behind and along with the expanding or expanding/bursting tool. Such a technique is useful particularly for pipes made of materials such as concrete, tile, or cast iron, which normally fracture into irregularly-shaped pieces or shards when engaged by a blow or like impact. An example of a system utilizing this type of technique is disclosed in U.S. Pat. Nos. 4,505,302; 4,720,211; and 4,738,565 to Streatfield et al. The pipe bursting tool of the Streatfield patents is adapted to engage the interior of the pipe to burst it, and to force the pipe fragments outwardly around the circumference of the tool to create a space for the new pipe, at least a portion of the outward forcing of the pipe fragments occurring at the same time the pipe is destroyed by the outwardly directed fracturing or bursting action.

U.S. Pat. No. 4,507,019 to Thompson discloses another pipe replacement system of the latter type, including a power system for imparting rotation as well as linear movement to an expansion and replacement mandrel as it is moved through the old pipe. The expansion replacement mandrel of the Thompson system includes a plurality of hard metal boring buttons of a material such as tungsten carbide to score the internal surface of the existing pipe as the mandrel is rotated and forced through the pipe. The Thompson system, like the Streatfield system, engages the inside diameter of the existing pipe to destroy it before initially fracturing it outwardly, i.e., by bursting it. The Streatfield and Thompson patents all disclose expanding the pipe fragments radially outwardly to cream a large enough space for pulling in a replacement pipe for the same or larger diameter behind, and along with, the respective bursting tools.

Other systems of this type for replacing an existing pipe, that is, systems relying on bursting the existing pipe from the inside, are disclosed in U.S. Pat. Nos. 4,634,313; 4,648,746; 4,674,914; 4,693,404; 4,732,222; and 4,767,236.

Another technique for replacing an existing pipeline is disclosed in U.S. Pat. No. 4,886,396 to Akesaka. Akesaka discloses apparatus and methods for advancing a shield tunneling machine from one end of the existing pipeline to the other, thereby excavating the existing pipeline with rotating cutters, and placing a new pipeline in the excavated spot while the machine is advanced. The shield tunneling machine of Akesaka may have a diameter larger than the diameter of the existing pipe, so it may excavate not only the existing pipe but also some of the surrounding ground.

A self-propelled pneumatic burrowing device is disclosed in U.S. Pat. No. 4,100,980 to Jenne. The Jenne device includes an axially reciprocating percussion plunger disposed inside a tubular casing so as to strike a percussion head at the forward end of the casing, thereby advancing the device through the ground by crushing and/or displacing the material in the path of the device.

U.S. Pat. No. 5,112,158 by McConnell, the inventor of the present invention, discloses an underground pipe replacement method and apparatus which first crushes the existing pipe entirely inwardly, or imploding it, to destroy it. The surrounding shards are then forced outwardly into the surrounding soil, creating a bore large enough to accommodate a replacement pipe at least as large as, or larger than, the old pipe. The new pipe is pulled into place substantially simultaneously with the expansion of the bore. The crushing tool includes a plurality of blades tapered outwardly and forwardly with a connecting rod connecting the crushing tool to an expanding plug. The expanding plug includes a conical nose for expanding the crushed pipe fragments into the surrounding soil and is pulled through the ground behind and along with the crushing tool, pulling with it the new pipe.

The prior art techniques which utilize apparatus that must be passed through the earth surrounding the old pipe or which require that the shards of the pipe be pressed into the surrounding earth have the common difficulty of passing through the surrounding earth formation where the earth formation surrounding the old pipe is extremely hard and imposes substantial resistance to the passage of the replacement apparatus through the earth or the expansion of the fragments or shards into the surrounding earth formation. Earth formations made of caliche, sandy clay with rock, extremely dry soil, or hard clay often are like concrete substantially increasing the amount of force required to pull tools through the old pipe.

The present invention overcomes the deficiencies of these prior art methods and apparatus.

SUMMARY OF THE INVENTION

The present invention includes a method and apparatus for replacing existing underground pipes. The method and apparatus includes placing a ripping tool into the bore of one end of the existing pipe. The ripping tool includes a plurality of cutting blades which cut a plurality of slots through the wall of the existing pipe as the ripping tool is passed through the bore of the pipe. Lengths of rods are attached to the trailing end of the ripping tool so as to dispose the lengths of rods throughout the length of the existing pipe. One end of the ripped pipe is then plugged and fluid such as water is allowed to pass through the open end of the pipe. The water is allowed to stand in the pipe and flow through the cuts in the pipe and into the formation. The water softens the earth formation around the pipe so as to reduce the force requirements for pulling a crushing tool through the existing pipe to destroy it.

BRIEF DESCRIPTION OF THE DRAWINGS

These and other objects and advantages of the present invention will become apparent as the following detailed description of preferred embodiments thereof is read in conjunction with reference to the accompanying drawings, wherein.

DETAILED DESCRIPTION OF THE PREFERRED EMBODIMENT

Figure 1:
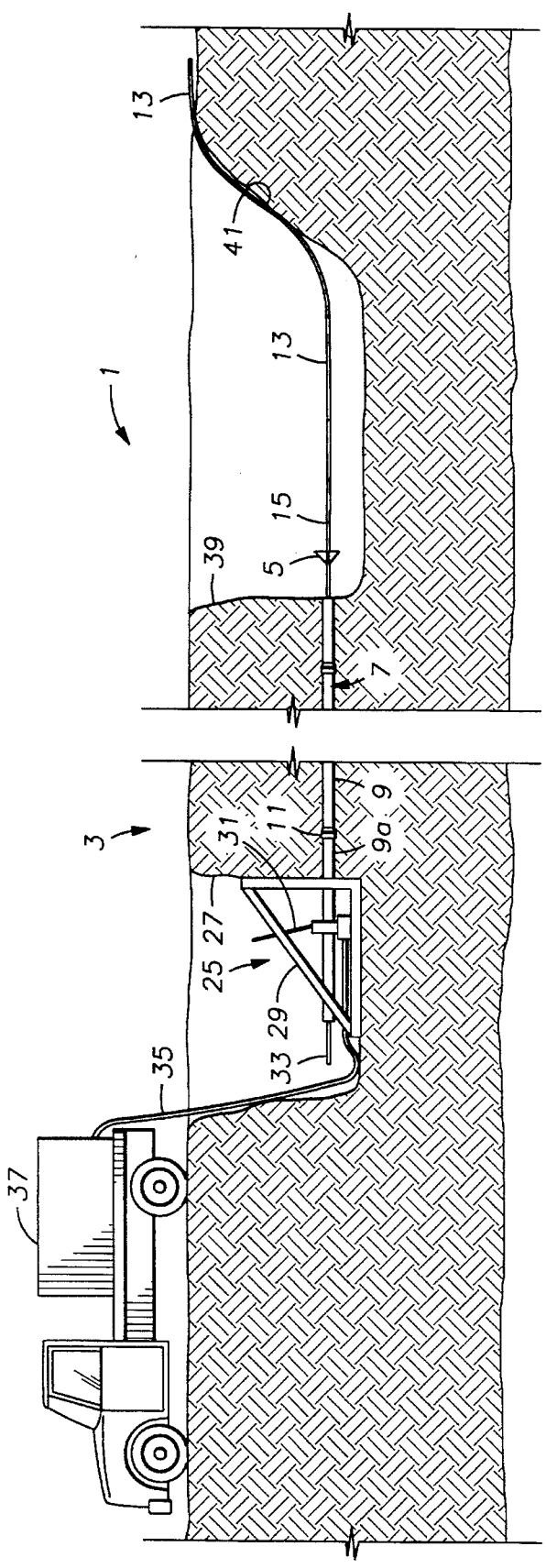
FIG. 1 is a fragmentary view, partly in elevation and partly in vertical section, of a preferred embodiment of the underground pipe replacement method and apparatus.

Referring initially to FIG. 1, there is shown a preferred embodiment of the method and apparatus of the present invention, indicated generally at 1, in place at a job site 3, with the ripping tool 5 about to be moved into place to rip an existing pipe 7 to be replaced. FIG. 1 illustrates the apparatus of the invention just prior to the ripping tool 5 being pulled through the existing pipe 7. The existing pipe 7 may comprise, for example, a water line, sewer pipe, gas main, or the like. Existing pipe 7 is preferably made of a frangible material such as concrete, tile, vitrified clay, cast iron, truss pipe or soil pipe material, or the like, and is thus preferably capable of being broken or fractured into a plurality of irregularly shaped shards or fragments. The existing pipe 7 may be partially corroded away or otherwise damaged, as by the corrosive effects of sewer gases against the upper portions of concrete sewer pipes. The existing pipe 7 may include a plurality of conduit sections 9 having a raised bell or flange 11 at one end for receiving the free end of the next succeeding spigot or conduit section 9a. The apparatus of the present invention also includes a plurality of rods 13 connected together end to end and having one end connected to the ripping tool 5 by means of a threaded joint 15. The connected rods 13 have a length sufficient to completely pass through the length of existing pipe 7.

A known hydraulic boring system 25 is disposed at the other end of the pipe to be replaced, that is, at the end of the existing pipe opposite to that adjacent the ripping tool 5. The hydraulic boring system 25 in disposed in an excavated pit 27, preferably at substantially the same level or depth as the pipe to be replaced. The system 25 includes a frame 29 for providing support and reactive force bracing means, a gripper 31 for sequentially engaging a plurality of lengths 33 of end-threaded rods, and a hydraulic line system 35 for supplying the system 25 with hydraulic fluid. A truck 37 provides power to run the system 25, which enables the rods 33 to be pulled or pushed axially through the existing pipe 7 with great force. Another excavation pit 39 is provided at the end of the pipe 7 where ripping is to begin. Typically, the rear side of the excavation pit 39 is more generally sloped, as at 41, in order to more easily connect and pull through a plurality of lengths of rods 13.

When the hydraulic system 25 is actuated, gripper 31 is made by an operator to engage the rods 13 one by one or in turn, and the hydraulic power is used to push or pull, as the case may be, the rods through the pipe 7 from pit 27 to pit 39 and back again, the return trip being accompanied by the ripping tool 5 and the lengths of rods 13. As indicated above, the force needed to pull the ripping tool 5 through the existing pipe 7 may be supplied, for example, by a winch operated from truck 37, or the like. Additional and varied force application means will no doubt be found useful in the present invention.

Figure 2:
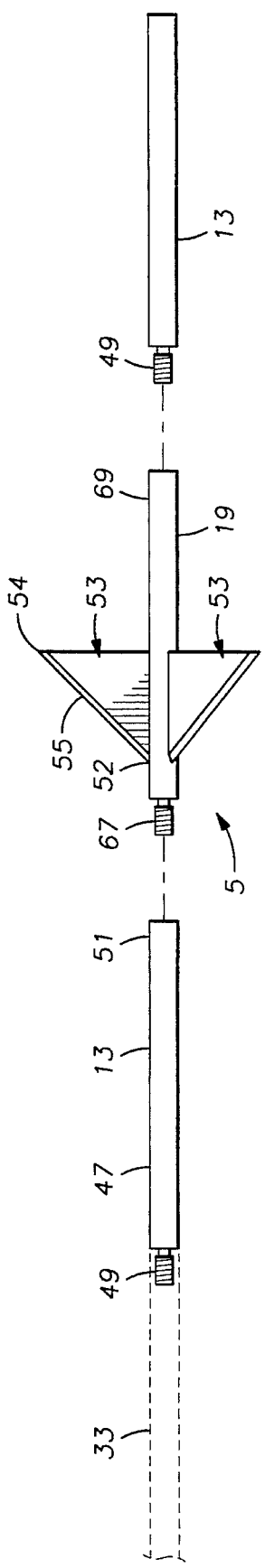
FIG. 2 is a side frontal pictorial view of the ripping tool and related connecting rods.
Figure 3:
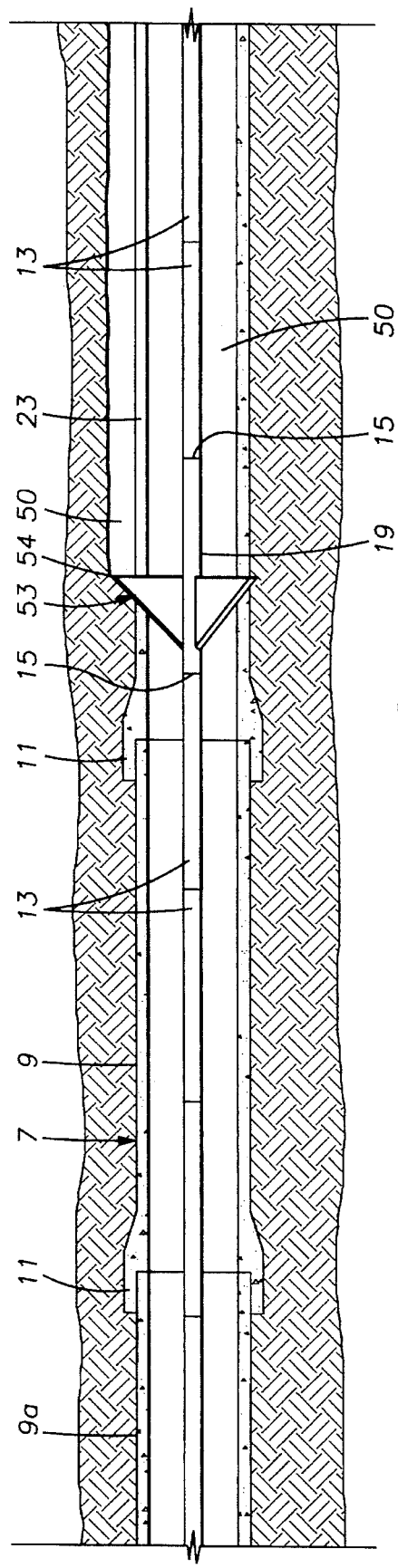
FIG. 3 is a view partly in section and partly in elevation, with some parts broken away, of the ripping tool in operation, i.e., being pulled along an existing pipe, ripping the pipe to allow water to pass into the surrounding earth formation.

Referring now to FIG. 2, the ripping tool 5 of the present invention is shown in greater detail. Ripping tool 5 of the present invention has a main shaft and a plurality of circumferentially spaced apart, longitudinally extending blades 53 connected, such as by welding, at their radially inner edges to the main shaft 19. Shaft 19 may, for example, be two inches in diameter and 18 inches long. Each blade 53 includes a pipe engaging leading edge 55 which tapers, preferably at a 45° angle, from the outside diameter of main shaft 19 at 52 and increases in the radial dimension to a point 54 whereby the radius of point 54 is greater than the radius of the existing pipe 7. Typically the blades 53 are ¾ inch thick and 10 to 12 inches long adjacent shaft 19. The blades 53 preferably extend radially outward a distance greater than the external surfaces of any outwardly extending flanges, bells or other connecting portions or joints 11 of the existing pipe 7 and preferably at least one inch beyond the greatest radius of pipe 7, such as at bells 11. Thus, the trailing point 54 of blades 53 extend through the exterior surfaces of the conduit sections 9 and joints 11 of existing pipe 7. For example, an existing pipe 7 having an 8 inch inside diameter and a bell 11 with an outside diameter 12¾ inches will be ripped by a tool 5 having 14 inch diameter blades 53. Preferably the blades 53 extend into the earth formation around the existing pipe 7 and cut into the ground to form longitudinal furrows 50 as shown in FIG. 3.

The leading edge 55 of the blades 53 is tapered in a manner so as to provide a substantially sharp leading edge for enabling the ripping tool 5 to better cut through the wall of the existing pipe 7. The sharpness of the leading edge 55 depends upon the material of the pipe being ripped. The ripping tool 5 is preferably made substantially entirely of steel or the like.

The front terminal end 67 of the main shaft 19 is attached to the lengths of rods 13 for example by joint means or the like. The tail end 69 of main shaft 19 secures the leading end of the trailing lengths of rods 13 by a means of a joint means 15 or the like.

An axially extending connecting rod 47 having connecting means 49, for example a threaded pin or box, disposed on its front end and connecting means 51, for example another threaded pin or box, disposed on its rear end is disposed on the front end of ripping tool 5. The connecting means 49 at the front end of the connecting rod 47 is adapted for connecting the ripping tool 5 to a rod 13, a cable, or the like for pulling the ripping tool 5 along the pathway of the existing pipe 7. The lengths of rods 13 are likewise connected to the trailing end of ripping tool 5.

Figure 4:
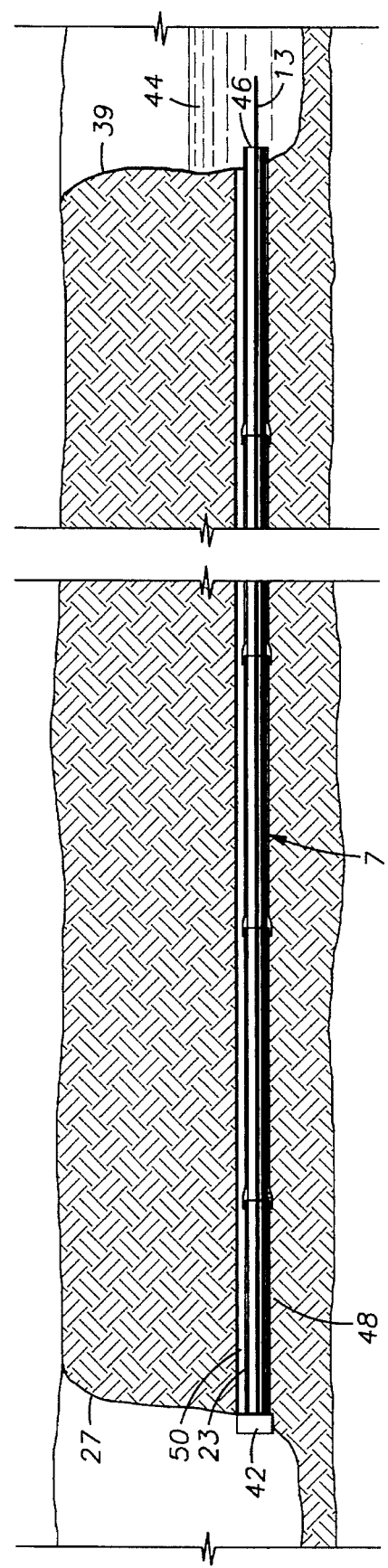
FIG. 4 is a cross-sectional view of the formation and the ripped pipe with water having seeped into the formation to soften the formation.

When the pulling means 25 is actuated to pull the ripping tool 5 along the pathway of the existing pipe, the blades 53 engage and rip the generally cylindrical wall of the conduit sections 9 thereby cutting a plurality of longitudinal cuts or slots 23 through existing pipe 7 as shown in FIG. 3 and 4. The cuts or slots 23 are relatively clean through pipe 7. The movement of the ripping tool 5 along the pipe 7 is effective without rotation.

Once the length of existing pipe 7 has been ripped forming slots or cuts 23 therethrough and furrows 50 have been made in the surrounding earth formation, one end of the existing pipe 7 is plugged at 42 such as by a plummer's plug, air plug, sandbag, or the like. The existing pipe 7 is then allowed to fill with existing sewer service or one of the pits such as pit 39 is filled with sufficient water 44 to cover the open end 46 of existing pipe 7. Existing pipe 7 is then allowed to fill so as to cause the water in the existing pipe 7 to flow through the slots or cuts 23 made in the pipe 7 by ripping tool 5 and into the furrows 50. The pit 39 may be filled with sufficient water 44 to provide a head such that the head applies some pressure to the water in the existing pipe 7 causing the water to pass through the slots or cuts 23 and into the furrows 50 in earth formation 48. The fluid or water is allowed to sit for a matter of hours as for example, at least two and up to twelve hours, to allow the fluid or water to have sufficient time to pass through the cuts 23 and into the furrows 50 in the soil and formation 48 around the existing pipe 7.

Once the earth formation 48 has been softened, the end of the lengths of rod 13 may be attached to a crushing tool (not shown) which is then pulled through the existing pipe 7 as taught by U.S. Pat. No. 5,112,158, incorporated herein by reference. The crushing tool first crushes the existing pipe 7 entirely inwardly, or imploding it, to destroy it. The resulting shards are then forced outwardly into the surrounding softened earth formation 48, creating a bore large enough to accommodate replacement pipe at least as large as, or larger than, the old pipe. The new pipe is pulled into place substantially simultaneously with the expansion of the bore.

Without softening the earth formation around the existing pipe 7, approximately 200 tons of pressure is required to crush the existing pipe 7. However, after softening the earth formation, only about 50–60 tons of pressure is required.

Although the foregoing describes a preferred embodiment of the invention, the example set out in the preceding description is for illustration purposes only, and is not intended to be limiting. One skilled in the art will no doubt discover that modifications to the particular apparatus and method disclosed herein may be made without departing from the spirit of the invention. Accordingly, the scope of the present invention shall only be determined through consideration and construction of the following claims.

What is claimed is:

1. A method for softening earth prior to replacing an existing, frangible underground pipe disposed in an earth formation comprising:

placing a ripping tool into one end of the existing pipe;

engaging the existing pipe with a plurality of cutting members disposed on the ripping tool;

cutting a plurality of slots through the existing pipe;

plugging one end of the cut pipe;

causing a fluid to flow into the cut pipe;

allowing the fluid to pass through the cuts and into the formation around the existing pipe to soften the earth formation around the existing pipe.

2. The method of claim 1 further including the step of attaching a plurality of lengths of rods to the trailing end of the ripping tool and disposing such lengths of rods within the existing pipe.

3. The method of claim 1 further including allowing a sewage service of the existing pipe to flow into the cut pipe for passage into the formation.

4. The method of claim 1 wherein the fluid flow causing step included the steps of filling the existing pipe with water and placing a head on the water to force the water through the cuts and into the earth formation.

5. The method of claim 1 wherein the fluid flow causing step includes the step of submerging the open end of the cut pipe into a pit filled with water.

6. The method of claim 1 further including the step of destroying the existing pipe after the earth has softened.

7. The method of claim 6 wherein the pipe destroying step includes passing a crushing tool through the existing pipe to crush the existing pipe inwardly to destroy it.

8. The method of claim 7 further including forcing the shards resulting from the crushing of the existing pipe outwardly into the surrounding softened earth formation.

9. The method of claim 8 further including the step of creating a bore large enough to accommodate a replacement pipe at least as large as the existing pipe.

10. The method of claim 9 further including the step of pulling the new pipe into place substantially simultaneously with the expansion of the bore.

11. The method of claim 6 wherein the pipe destroying step includes passing a bursting tool through the existing pipe to break the pipe outwardly to destroy it.

* * * * *

UNITED STATES PATENT AND TRADEMARK OFFICE
CERTIFICATE OF CORRECTION

PATENT NO. : 5,507,597
DATED : APRIL 16, 1996
INVENTOR(S) : W. HARRY McCONNELL

It is certified that error appears in the above-identified patent and that said Letters Patent is hereby corrected as shown below:

Col. 1, line 23, insert --to-- after "necessary" and before "repair".

Col. 1, line 32, delete [carded] and insert --carried--.

Col. 1, line 60, delete [disclose] and insert --discloses--.

Col. 2, line 41, delete [cream] and insert --create--.

Col. 5, line 19, insert --,-- after "50".

Signed and Sealed this

Fifteenth Day of October, 1996

Attest:

BRUCE LEHMAN

*Attesting Officer*    Commissioner of Patents and Trademarks